US012085792B2

(12) United States Patent
de Pablo et al.

(10) Patent No.: US 12,085,792 B2
(45) Date of Patent: Sep. 10, 2024

(54) MOLECULAR REORIENTATION OF LIQUID CRYSTALS USING ACOUSTIC WAVES AND FLUID FLOW IN CONFINEMENT

(71) Applicant: The University of Chicago, Chicago, IL (US)

(72) Inventors: Juan Jose de Pablo, Chicago, IL (US); Gustavo Andres Vasquez Montoya, Chicago, IL (US); Tadej Emersic, Chicago, IL (US)

(73) Assignee: The University of Chicago, Chicago, IL (US)

( * ) Notice: Subject to any disclaimer, the term of this patent is extended or adjusted under 35 U.S.C. 154(b) by 0 days.

(21) Appl. No.: 18/330,723

(22) Filed: Jun. 7, 2023

(65) Prior Publication Data

US 2023/0400719 A1 Dec. 14, 2023

Related U.S. Application Data

(60) Provisional application No. 63/366,062, filed on Jun. 8, 2022.

(51) Int. Cl.

| | |
|---|---|
| ***G02F 1/1337*** | (2006.01) |
| ***G02F 1/11*** | (2006.01) |
| *H04R 23/00* | (2006.01) |

(52) U.S. Cl.

CPC ........ *G02F 1/113* (2013.01); *G02F 1/133742* (2021.01); *G02F 1/133757* (2021.01); *H04R 23/008* (2013.01)

(58) Field of Classification Search

CPC ..................................................... G02F 1/1337

See application file for complete search history.

(56) References Cited

U.S. PATENT DOCUMENTS

| | | | | |
|---|---|---|---|---|
| 4,471,385 A * | 9/1984 | Hyatt | G03F 9/7088 | 348/766 |
| 2006/0275883 A1* | 12/2006 | Rathgeber | B01L 3/5085 | 366/127 |
| 2009/0027872 A1* | 1/2009 | Debije | H01L 31/055 | 362/84 |

OTHER PUBLICATIONS

Bertolotti M., et al., "Acoustic Modulation of Light by Nematic Liquid Crystals," Applied Physics Letter, 1972, vol. 21 (2), pp. 74-75.

Copar S., et al., "Microfluidic Control over Topological States in Channel-Confined Nematic Flows," Nature Communications, 2020, vol. 11 (59), pp. 1-10.

Cuennet J.G., et al., "Optofluidic Modulator Base Don Peristaltic Nematogen Microflows," Nature Photonics, 2011, vol. 5 (4), pp. 234-238.

Emersic T., et al., "Sculpting Stable Structures in Pure Liquids," Science Advances, 2019, vol. 5 (2), pp. 1-8.

Gustavo A., et al., Acoustic Optofluidics on Nematic Liquid Crystals. Poster Presented at: Midwest Thermodynamics and Statistical Mechanics Conference, The University of Chicago, Jun. 14-16, 2021, 1 page.

(Continued)

*Primary Examiner* — Sang V Nguyen

(74) *Attorney, Agent, or Firm* — Weaver Austin Villeneuve & Sampson LLP

(57) ABSTRACT

Optofluidic devices configured confine liquid crystals within a fluidic channel under the application of acoustic waves and pressure-driven flow and related methods of use are described.

25 Claims, 7 Drawing Sheets

(56) References Cited

OTHER PUBLICATIONS

Inoue M., et al., "Evaluation of Nematic Liquid-Crystal Director-Orientation using Shear Horizontal Wave Propagation," Journal of Applied Physics Journal of Applied Physics, vol. 91(5), pp. 2798-2802.
Kapustina O.A., et al., "Ultrasound-Initiated Structural Transformations in Liquid Crystals (A Review)," Acoustical Physics, 2008, vol. 54 (2), pp. 180-196.
Lee W., et al., "Acousto-Optical Effect Induced by Ultrasound Pulses in a Nematic Liquid-Crystal Film," Applied Optics, 2001, vol. 40, No. 10, pp. 1682-1685.
Mailer H., et al., "Effect of Ultrasound on a Nematic Liquid Crystal," Applied Physics Letters, 1971, vol. 18 (4), pp. 105-107.
Migara L.K., et al., Standing Wave-Mediated Molecular Re-Orientation and Spontaneous Formation of Tunable, Concentric Defect Arrays in Liquid Crystal Cells, NPG Asia Materials, 2018, vol. 10 (e459).
Miyano K., et al., Domain Pattern Excited by Surface Acoustic Waves in a Nematic Film, Applied Physics Letter, 1976, vol. 28, pp. 473-475.
Nagai S., et al., "Acousto-Optical Effects in a Nematic Liquid Crystal," Journal of Applied Physics, 1977, vol. 12 (1), pp. 21-30.
Nagai S., et al., "On the Effect of Ultrasound to Nematic Liquid Crystal," Japanese Journal of Applied Physics, 1974, vol. 13 (1), pp. 189-190.
Ozaki R., et al., "Lasing in Cholesteric Liquid Crystal Oriented by Acoustic Streaming," Japanese Journal of Applied Physics, 2008, vol. 47 (2), pp. 1363-1366.
Pieranski P., et al., Hedgehogs in the Dowser State, The European Physical Journal, 2016, vol. 39 (12), pp. 1-10.
Psaltis D., et al., "Developing Optofluidic Technology through the Fusion of Microfluidics and Optics," Nature, 2006, vol. 442, pp. 381-386.
Sato S., et al., "Effects of Surface Acoustic Waves on Molecular Orientation in Nematic Liquid Crystals," Japanese Journal of Applied Physics, 1981, vol. 20 (7), pp. L511-L514.
Scudieri F., et al., "Acoustohydrodynamic Instability in Nematic Liquid Crystals," Journal of Applied Physics, 1976, vol. 47, pp. 3781-3783.
Sengupta A., et al., "Liquid Crystal Microfluidics for Tunable Flow Shaping," Physical Review Letters, 2013, vol. 110, pp. 1-5.
Sripaipan C., et al., "Ultrasonically-Induced Optical Effect in a Nematic Liquid Crystal," Physical Review, 1977, vol. 15 (3), pp. 1297-1303.
Vasquez-Montoya G.A., et al., "Acousto-Microfluidic Control of Liquid Crystals," eprint arXiv:2304.12996, 2023, pp. 1-17.
Vasquez-Montoyo G.A., et al., "Control of Liquid Crystals Combining Surface Acoustic Waves, Nematic Flows, and Microfluidic Confinement," Soft Matter, 2024, vol. 20, pp. 397-406.
Witkowska-Borysewicz M., et al., "Optically Detected Variations of Nematic Liquid Crystal Orientation Induced by Ultrasound," Journal of Physics, 1983, vol. 44, pp. 411-420.

* cited by examiner

MOLECULAR REORIENTATION OF LIQUID CRYSTALS USING ACOUSTIC WAVES AND FLUID FLOW IN CONFINEMENT

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in their entireties and for all purposes.

BACKGROUND

Optofluidic systems have been generally divided into solid-liquid hybrids in which, colloid-based solutions systems, and fully liquid systems. Liquid crystal (LC) optofluidic devices are fully liquid systems. LCs have unique optical properties arising from their anisotropic nature and collective structural organization.

SUMMARY

Provided herein are optofluidic devices that confine liquid crystals within a microfluidic channel under the application of acoustic waves and fluid flow.

One aspect of the disclosure relates to an optofluidic device including a fluid channel with liquid crystal material therein; and one or more transducers configured to output acoustic waves, wherein the one or more transducers and the channel are disposed such that the output acoustic waves interact with the liquid crystal material.

In some embodiments, the channel is disposed between first and second transducers. In some embodiments, the device includes only one transducer. In some embodiments, the channel is in contact with the one or more transducers. In some embodiments, the liquid crystal material includes homeotropic anchored nematic liquid crystals. In some embodiments, wherein the liquid crystal material includes planar anchored nematic liquid crystals. In some embodiments, the liquid crystal material includes both planar and homeotropic anchored liquid crystals.

In some embodiments, where at least part the channel is coated with a material capable of inducing surface anchoring of the liquid crystal material. In some such embodiments, the material is capable of inducing homeotropic anchoring in at least a portion of the liquid crystal material. In some such embodiments, the material is capable of inducing planar anchoring in at least a portion of the liquid crystal material.

In some embodiments, a first region of the channel is coated with a first material capable of anchoring the liquid crystal material in a first orientation and a second region of the channel is capable of anchoring the liquid in a second orientation, wherein the second orientation is different from the first orientation.

In some embodiments, the one or more transducers are formed in a piezoelectric substrate. In some embodiments, the optofluidic device further includes a vacuum or fluid source configured to induce fluid flow of the liquid crystal material in the fluidic channel. In some embodiments, at least a portion of the channel is bonded to or formed in or on the piezoelectric substrate.

In some embodiments, the acoustic waves are surface acoustic waves. In some embodiments, the acoustic waves are bulk acoustic waves. In some embodiments, the device is configured to generate acoustic waves to interact with the liquid crystal material and fluid flow of the liquid crystal material in the channel. In some such embodiments, an optical response is generated.

Another aspect of the disclosure relates to a method including: providing an optofluidic device according that includes including a fluid channel with liquid crystal material therein; and one or more transducers configured to output acoustic waves, applying a signal to the one or more transducers for transformation into acoustic waves to interact with the liquid crystal material and/or apply a signal to induce fluid flow of the liquid crystal material, to thereby induce reorientation of liquid crystal molecules in the liquid crystal material.

In some embodiments, the method further includes causing fluid flow of the liquid crystal material in the channel. In some embodiments, an optical response is generated by the reorientation of liquid crystal molecules. In some such embodiments, the optical response is characterized by patterns induced by the acoustic waves and the fluid flow. In some embodiments, the optical response is characterized by a stripe pattern. In some embodiments, the optical response is characterized by birefringent lines at pressure nodes in the microfluidic channel. In some embodiments, the optical response is a sub-millisecond optical response. In some embodiments, the optical response can be modulated by controlling the amplitude, frequency, and other properties of the applied acoustic waves. In some embodiments, the optical response can be modulated by controlling the flow rate and other properties related to the fluid flow generated in the fluidic channel.

These and other aspects of the disclosure are described further below with reference to the drawings.

BRIEF DESCRIPTION OF DRAWINGS

FIGS. 2A to 2D show fluorescence confocal polarizing microscopy (FCPM) imaging of the top view (xy plane) and cross section (yz plane) of a microfluidic channel corresponding to the optical observation of NLC with no patterns (A), white stripe patterns (B), color stripe patterns (C), and brown stripe patterns (D). FIGS. 2E to 2H show schematic representation of director orientation for the case of no patterns (E), white stripe patterns (F), color stripe patterns (G), and brown stripe patterns (H). FIG. 2I shows fluorescent signal intensity as a function of the channel width for all stripe patterns. FIG. 2J shows a POM image of stripe patterns with the corresponding director field orientation predicted by numerical simulations. FIG. 2K shows aligning of molecules on pressure nodes induces periodic distribution of the scalar order parameter across the channel. FIG. 2L shows predicted acoustic streaming flow (represented with arrows) around the pressure nodes.

DETAILED DESCRIPTION

The present disclosure relates to optofluidic devices including liquid crystals in fluidic channels and related methods of use. Embodiments of the optofluidic devices combine acoustic waves and fluid flow to change the molecular organization of liquid crystals. This allows for precise spatio-temporal manipulation of the molecular orientation of the liquid crystals and optical properties.

Harnessing optical properties of liquid crystals due to their anisotropic shape and collective structural organization has been transformative to modulate optical responses leading to the development of sophisticated displays, diagnostics, and sensing technologies. Combining the strengths of molecular reorientation in confinement induced by nematic flow and acoustic waves, the optofluidic devices described herein generate optical response of nematic liquid crystals with sub-millisecond response times. The optical response can be modulated temporally and spatially with precision allowing for enhanced control of the liquid crystal orientation.

Figure 1A:
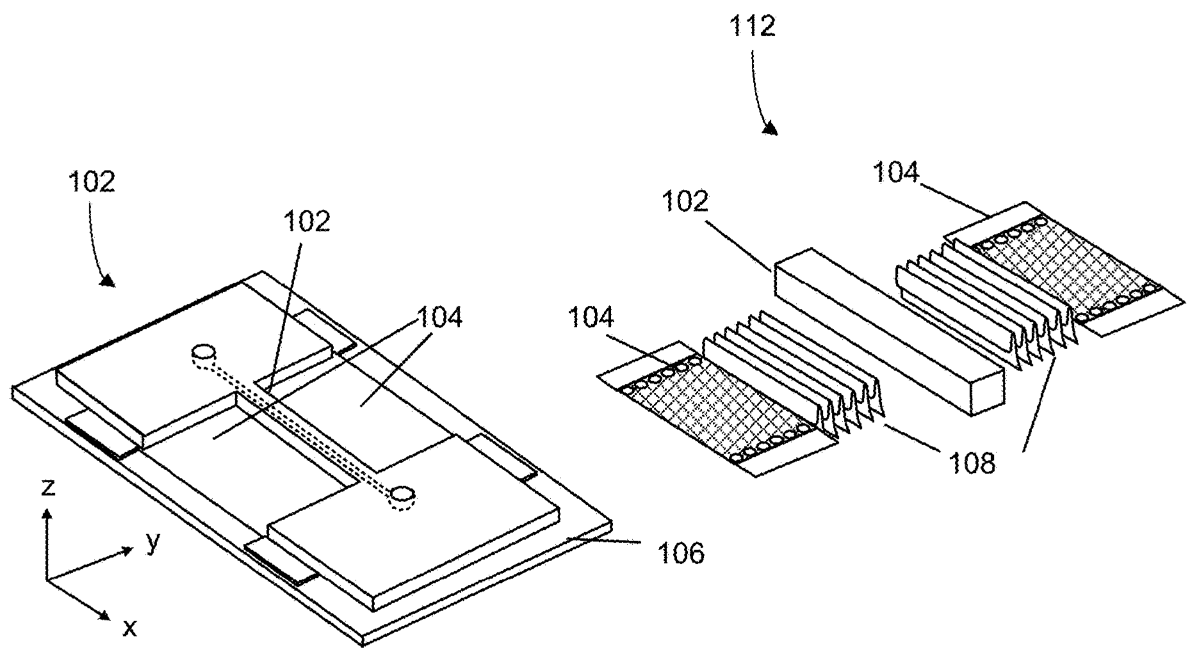
FIG. 1A shows a schematic representation of a fluidic channel on a piezoelectric substrate with two pairs of parallel interdigitated transducers to generate standing surface acoustic waves (standing SAWs or SSAWs).

According to various embodiments, an optofluidic device described herein includes a channel filled (or configured to be filled) with liquid crystal material and an acoustic wave generator. An example of an optofluidic device is shown in FIG. 1A. Components of the optofluidic devices disclosed herein are discussed below with reference to the example of FIG. 1A, including modifications according to various embodiments.

In FIG. 1A, an optofluidic device 100 is shown, including a fluidic channel 102. In the example of FIG. 1A, the fluidic channel 102 is a microfluidic channel formed from polydimethylsiloxane (PDMS). As used herein, a channel refers to any structure that can confine fluid and which fluid may flow. A channel may be characterized by a length in the direction of fluid flow and a cross-sectional area. In some embodiments, the fluidic channels are microfluidic channels. Microfluidic channels fabricated in the nanometer to millimeter scale, with microfluidic channels having cross-sectional dimensions ranging from about 1 nm to several mm.

Fluidic channels and, more particularly, microfluidic channels are not limited to any particular fabrication process. While conventional microfluidic channel fabrication techniques may be employed, the optofluidic devices and channels are not limited, and may be produced by any technique including 3D printing techniques, lithographic techniques, embossing techniques, and the like. The fluidic channel may have any appropriate cross-section, including rectangular, square, circular, triangular cross-sections, etc. The fluidic channel may be straight, curved, and/or have one or more angles. According to various embodiments, the cross-sectional shape and/or dimensions may be substantially constant or vary along the length of the channel.

The fluidic channels may be any appropriate size as long as the acoustic wave propagates through the entire material. In some embodiments, the channel cross-section size is constrained by its characteristic length in the direction of light propagation. In some embodiments, the fluidic channel has a rectangular cross-section with a width of arbitrary dimensions and a height of less than 100 microns. Example heights may range from 12 to 75 microns to obtain the best optical effect. In channels with rectangular cross-section that have larger heights, the optical effects may have more interference.

The fluidic channel may be made of an appropriate material, including PDMS. In some embodiments, the fluidic channel is coated with or made from a material that induces a certain surface anchoring of the liquid crystal material. For example, the liquid crystal material may include homeotropic and/or planar anchored liquid crystals. In some embodiments, different sections of the fluidic channel are made from and/or coated with different materials to induce different surface anchoring at different sections of the channel. The surface anchoring may change from one linear section of the fluidic channel to the next. In the same or other embodiments, different surfaces at the same position along the channel may induce different surface anchoring. For example, for a rectangular channel, the top surface may induce planar anchoring, the bottom surface may induce homeotropic anchoring, with the sidewall surface inducing planar or homeotropic anchoring. Other orientations such as tilted orientations may be induced depending on the material Examples of coatings include but are not limited to, functionalization of the surface with DMOAP (dimethyloctadecyl [3-(trimethoxy silyl)propyl]ammonium chloride) coupling agent to induce homeotropic anchoring and polyvinyl alcohol (PVA) alignment layer for planar anchoring.

The fluidic channel may be formed in or attached to a device substrate in some embodiments.

The term acoustic wave generator refers to a device, material, pattern or other that can generate an acoustic wave.

Returning to FIG. 1A, the optofluidic device 100 includes two interdigitated transducers 104 (IDTs) that generate surface acoustic waves 108 (SAWs). These surface acoustic waves are propagated toward the fluidic channel 102 to interact with the liquid crystal material therein as shown in the enlarged view at 112.

According to various embodiments, the acoustic waves may be surface acoustic waves (as in the example of FIG. 1A) or bulk acoustic waves. Any appropriate acoustic wave generator may be used and include any transducer that outputs acoustic waves. In some embodiments, a transducer made of a piezoelectric material is used. Examples of piezoelectric materials that may be used include quartz ($SiO_2$), lithium tantalate ($LiTaO_3$), lithium niobate ($LiNbO_3$), gallium arsenide (GaAs), silicon carbide (SiC), langasite (LGS), zinc oxide (ZnO), aluminum nitride (AlN), lead zirconium titanate (PZT), and polyvinylidene fluoride (PVdF). In some embodiments, the acoustic wave generator is formed in a piezoelectric substrate. An example is shown in FIG. 1A, in which the IDTs 104 are formed in piezoelectric substrate 106. In the example of FIG. 1A, the fluidic channel 102 is bonded to the piezoelectric substrate.

The optofluidic device includes at least one acoustic wave generator that is disposed such that that acoustic waves propagate through and interact with the liquid crystal material in the fluidic channel. In some embodiments, the acoustic wave generator will be disposed such that the direction of propagation of the acoustic waves is perpendicular to, parallel to, or at an angle with respect to the length of the channel or the direction of fluid flow. The acoustic wave generator may be adjacent to, over, or under a channel. In some embodiments, multiple acoustic wave generators are employed. A fluidic channel may be disposed between the multiple acoustic wave generators. The acoustic wave generator may be in contact or spaced apart from the channel.

Any appropriate liquid crystal material that is capable of forming a nematic phase may be used. The nematic liquid crystal state or nematic liquid crystal (NLC) is typically characterized by anisotropic molecules that have no positional order but tend to point in the same direction. Additional to nematic, they may form a chiral or smectic phase. They can be substantially oriented by channel surface, fluid flow, and acoustic waves.

The optofluidic device may include vacuum or pressure sources and a controller configured to induce fluid flow of the liquid crystal material through the channel. In some configurations the fluid flow will be induced by external vacuum or pressure sources connected to the device. In some configurations the fluid flow will be induced by controlling microfluidic pumps and valves incorporated into the device. In some configurations the flow will be induced by combinations of external vacuum and pressure sources, fluidic valves, pumps and other fluidic components of the like.

In some embodiments, operation of the optofluidic device includes a combination of pressure-driven nematic flow and acoustic waves to re-arrange the liquid crystals. Acoustic-induced patterns in confined NLC material are described with reference to FIGS. 1B-2L. Acoustic-induced patterns in pressure-driven nematic flow are described with reference to FIGS. 3A-5D.

Acoustic Induced Patterns in Confined NLC

Figure 1B:
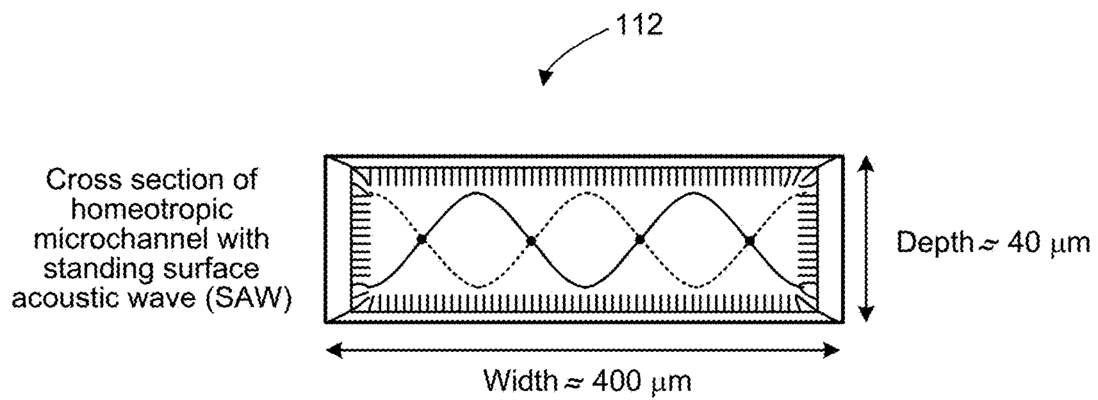
FIG. 1B shows an example cross-section of a fluidic channel with nodes and anti-nodes of a SSAW.

FIG. 1B shows a cross-section 112 of a standing surface acoustic wave (S SAW) in a homeotropic channel. A radio frequency (RF) signal to the IDTs with a specified input power can be applied from a signal generator. The electrical signal is transformed into SAWs by the IDTs 104, traveling along the piezoelectric substrate 106 and interacting with a NLC as shown in FIG. 1A at 110. The two parallel IDT 104 on the surface of the substrate receive the RF signal and form SSAWs where a harmonic standing pressure field with nodes and anti-nodes is formed. The amplitude of the acoustic wave is proportional to the input power applied to generate the RF signal.

Figures 1C, 1D, 1E, 1F, 1G, 1H, 1I, 1J, 1K, 1L:
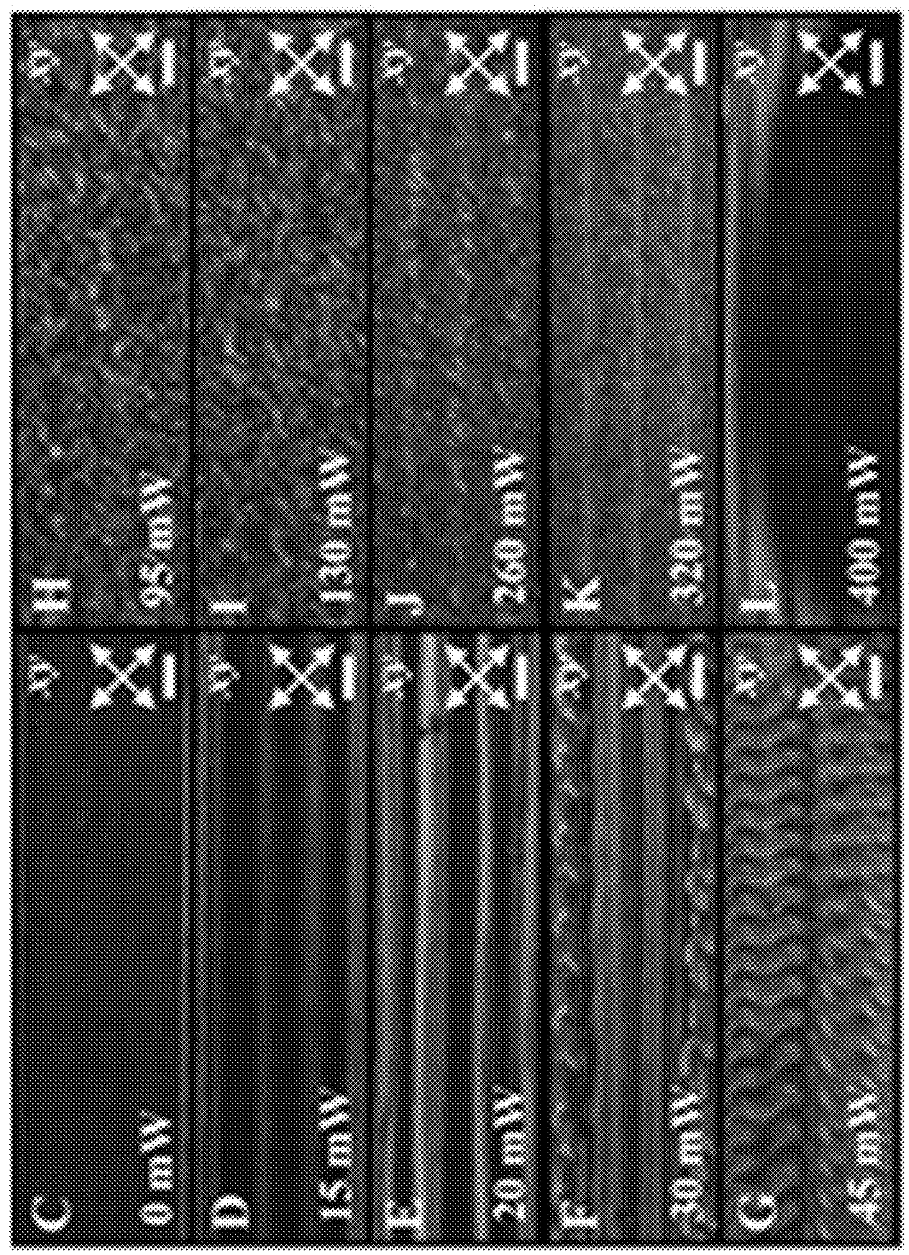
FIGS. 1C-1L shows polarized optical microscopy (POM) images of a top view of a nematic liquid crystal (NLC) in a microfluidic channel under SSAWs. Different powers of SAWs lead to the optical observation of the NLC with no patterns (C), white stripe patterns (D), color stripe patterns (E), brown stripe patterns with eddies-like flow near the walls (F), the spatial dynamic flow of periodic structures (G), turbulent-like flow behavior and dynamic scattering (H and I), turbulent-like flow behavior with stripes (J and K) and transition into isotropic phase (L). White crossed double arrows show the orientation of the polarizers.

Polarized optical microscopy (POM) images in FIG. 1C to 1L show the evolution of the optical response of NLC as a function of the amplitude of the SSAWs. Without SSAWs, the nematic in a channel with homeotropic surface anchoring looks dark under POM (FIG. 1C). After applying the SAW with the input power of 15 mW, the emergence of bright white stripe patterns is observed at the SSAW pressure nodes (FIG. 1D). Increasing the input power up to 20 mW promotes the appearance of birefringent colors in the stripe patterns (FIG. 1E). By further increasing the power, a discontinuous transition occurs in which disclination lines appear on the bright stripes, seen as a brown color under POM followed by eddies-like shape NLC flows that arise near the channel walls (FIG. 1F). At SAW power around 45 mW, dynamic periodic patterns reminiscent of cholesteric shapes are observed (FIG. 1G). Beyond this point, higher acoustic amplitude sets the further transition to a chaotic turbulent-like flow behavior where dynamic scattering prevails (FIGS. 1H and 1I).

Further increasing the wave amplitude promotes the formation of stripe patterns intercalated within the previously observed turbulent-like flow behavior (FIGS. 1J and 1K). In contrast with the stripes observed at lower values of the input power, these stripes are located by the SSAW pressure anti-nodes. Lastly, applying an input power larger or equal to 400 mW induces transition into an isotropic phase (FIG. 1L). The temperature within the channel increases linearly with the input power of the RF signal for the SSAW, driving the nematic-isotropic phase transition at high input power. Experiments also indicate that the optical intensity along pressure nodes ramps up once the system reaches the white stripe patterns with a maximum in the case of colored stripe patterns, followed by a decrease in intensity toward the brown stripes region.

Reaction time scales of acoustic-induced patterns in the optofluidic devices may be characterized by the relaxation time to return to equilibrium after turning off the acoustic waves and by the response time required to reach a stable optical response after turning on the acoustic waves. For a SSAW system as described with respect to FIG. 1B, the relaxation time of the system is of the order of a few seconds and increases with the input power throughout the stripes pattern regions and plateau during the turbulent-like flow behavior. Once the system reaches a turbulent-like flow with lines (FIGS. 1J and 1K), the relaxation time increases again until it reaches the isotropic phase. In contrast, the response time reaches a maximum in the color stripes pattern region which corresponds to the highest optical intensity. After that, the response time decreases reaching a plateau during the brown stripes and onset of the turbulent-like flow behavior.

Figures 2A, 2B, 2C, 2D, 2E, 2F, 2G, 2H, 2I, 2J, 2K, 2L:
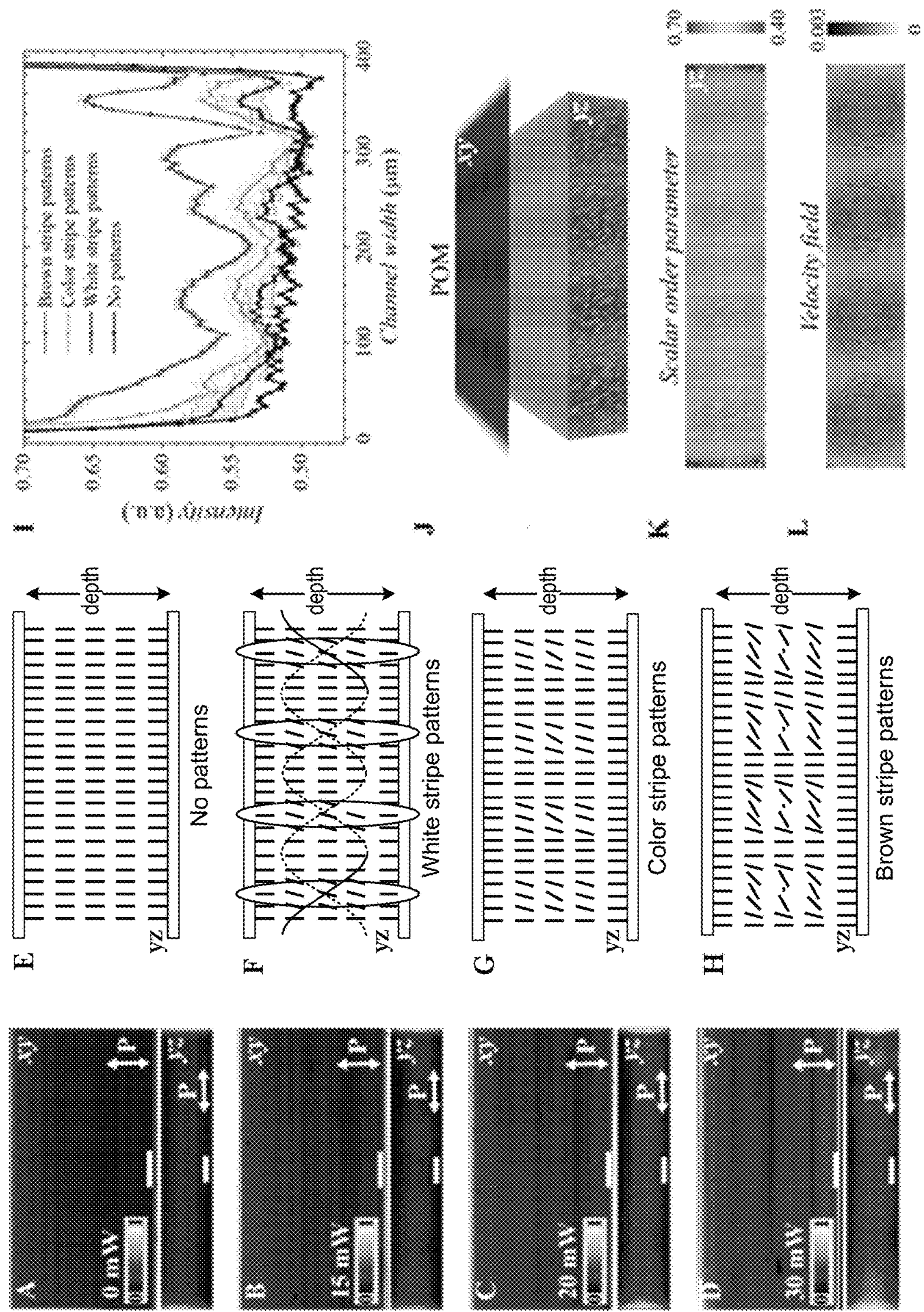
FIGS. 2A-2L show analysis of the nematic response under a low power SAW.

The spatial orientation of the NLC molecules in a homeotropic microfluidic channel under SSAWs were resolved by performing fluorescence confocal polarizing microscopy (FCPM) imaging along the top view (xy plane) and cross section (yz plane) as shown in FIGS. 2A, 2B, 2C, and 2D. High fluorescence intensity indicates that the director field is oriented parallel to the polarization of the laser beam while low fluorescence signal indicates an orthogonal orientation. Applying SSAWs induce an intense fluorescent signal on the vicinity of pressure nodes which indicates tilting of the nematic molecules. Increasing the input power increases the FCPM signal which indicates even stronger tilting of molecules towards the polarized beam. The reorientation gradually evolves from relatively short tilting, which corresponds to the formation of the white stripes (FIGS. 2B and 2F) to more pronounced tilted molecules, corresponding to the colored stripes (FIGS. 2C and 2G). Higher input power induces the formation of disclination lines, which formation results from a larger inclination of the molecules (FIGS. 2D and 2H). Once the system reaches the turbulent-like flow behavior these structures collapse. Measured fluorescent signal intensity for all stripe patterns as a function of the channel width is summarized in FIG. 2I. In FIG. 2I, the curves from bottom to top are: no patterns, white stripe patterns, color stripe patterns, and brown stripe patterns.

The experimental results of stripe patterns are supported by numerical simulations that combine an acoustic field with the hydrodynamic evolution of confined NLC. For low acoustic intensity, the presence of a standing pressure wave reveals stripe patterns as a result of the periodic distribution of the order parameter across the channel based on the periodicity of the acoustic wave as shown in the predicted POM image (FIGS. 2J and 2K). This corresponds to the tilting of molecules in the vicinity of the acoustic pressure nodes with elastic forces of NLC and acoustic forces in balance. The simulations also indicate the onset of streaming flows around the acoustic pressure nodes (FIG. 2L). Once acoustic forces dominate over elastic forces, lines patterns become unstable and collapse into turbulent-like flow behavior. While numerical predictions support experimental observation in the case of low acoustic intensity, high acoustic intensity dynamics are beyond the limitations and assumptions of the model.

Acoustic-Induced Patterns in the Pressure-Driven Nematic Flow

Figure 3A:
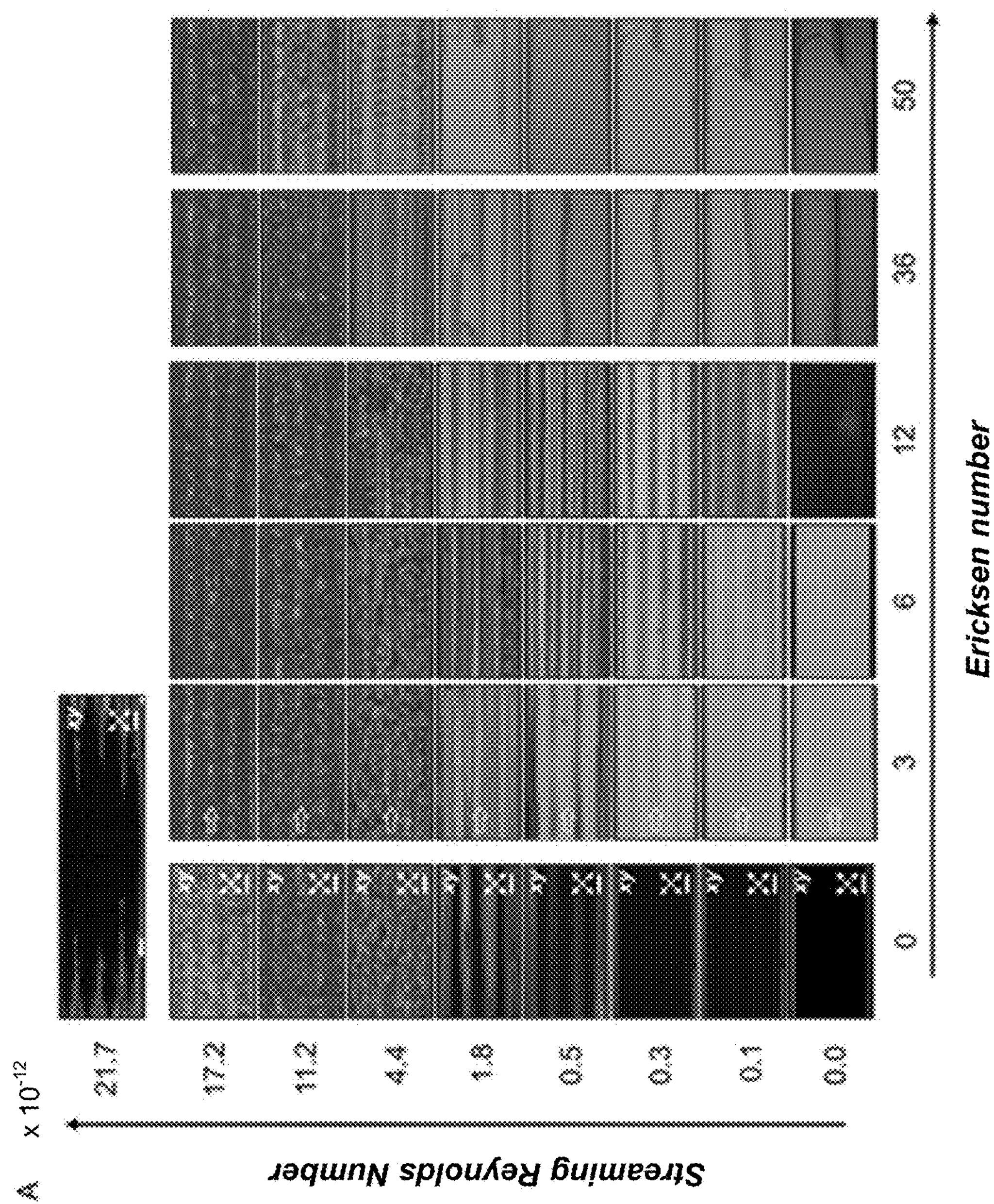
FIG. 3A show POM images obtained from the combination of applying SSAWs and Poiseuille flow of the nematic liquid crystal.

According to various embodiments, methods described herein involve obtaining optical responses by applying acoustic waves and Pouiseuille (pressure-driven) flow of the NLC. FIG. 3A shows the effect of SSAWs and pressure-driven nematic flow in a homeotropic microfluidic channel. The dependence on the SAW input power that controls the amplitude of the acoustic wave is captured using the dimensionless streaming Reynolds number $Re_s$ while the dependence on pressure-driven flow is measured by the Ericksen number Er. POM images for various Ericksen numbers and streaming Reynolds numbers are shown in FIG. 3A.

Without flow and in the absence of acoustic waves, the channel appears dark under POM corresponding to uniformly aligned homeotropic configuration along the z-axis. Upon starting the flow without acoustic waves, birefringent colors start to appear in the weak flow regime ($0<Er<21$) indicating a slightly bowed uniform director field towards the flow direction—known as bowser state. An increase in velocity to medium flow regime ($21\leq Er<50$) induces continuous transformation of bowser state into a characteristic chiral state with left and right-handed domains separated by flexible soliton-like structure in the center of the channel. With higher flow rates ($Er\geq 50$), the nematic undergoes a discontinuous transition into a flow-aligned state known as a dowser state. These flow states and in good agreement with observations in a larger channel.

Applying SSAWs in flow regimes induce an interplay between acoustic and nematic flow fields on the orientation of the director field that results in characteristic acoustofluidic-induced patterns. Low SSAW input power with the $Re_s$ between $1.8\times10^{-13}$ and $1.8\times10^{-12}$ results in combinations of birefringent stripe patterns in a bowser state consistent with a superposition of the reorientation effects of the low-intensity acoustic pressure field and the fluid flow field on the NLC. As the input power is increased, a disruption of the stripe patterns occurs, caused by the onset of the brown lines pattern dominating over the Poiseuille flow. A transition into a flow pattern dominated by the acoustics-induced turbulent-like flow and dynamic scattering is reached when $Re_s>5.5\times10^{-12}$ (125 mW).

Without SAWs, characteristic bowser, chiral and dowser states arise for $Er<12$, $12<Er<50$, and $Er\geq 50$, respectively. In the bowser state, low acoustic intensities with $Re_s<1.8\times10^{-12}$ lead to characteristic acoustofluidic-induced colored stripe patterns. As the acoustic intensity is increased, the system transitions into a turbulent-like dynamic behavior. In chiral and dowser states, the orientation of the molecules induced by the flow dominates until the acoustic intensity is high enough ($Re_s>5.5\times10^{-12}$) to induce turbulent-like behavior. At $Re_s>1.7\times10^{-11}$ the system transitions into an isotropic phase regardless of nematic flow.

In contrast, medium and high flow regimes ($Er\geq 21$) dominate the alignment of nematic molecules over the acoustic field when $Re_s<1.8\times10^{-12}$. For these flows at higher input power, acoustic-induced reorientation with streaming flow competes with the pressure-driven flow-induced alignment until the system reaches a turbulent-like flow regime with lines. Regardless of the flow rate, the system evolves into the isotropic phase when sufficient SAW input power is applied.

Figure 3B:
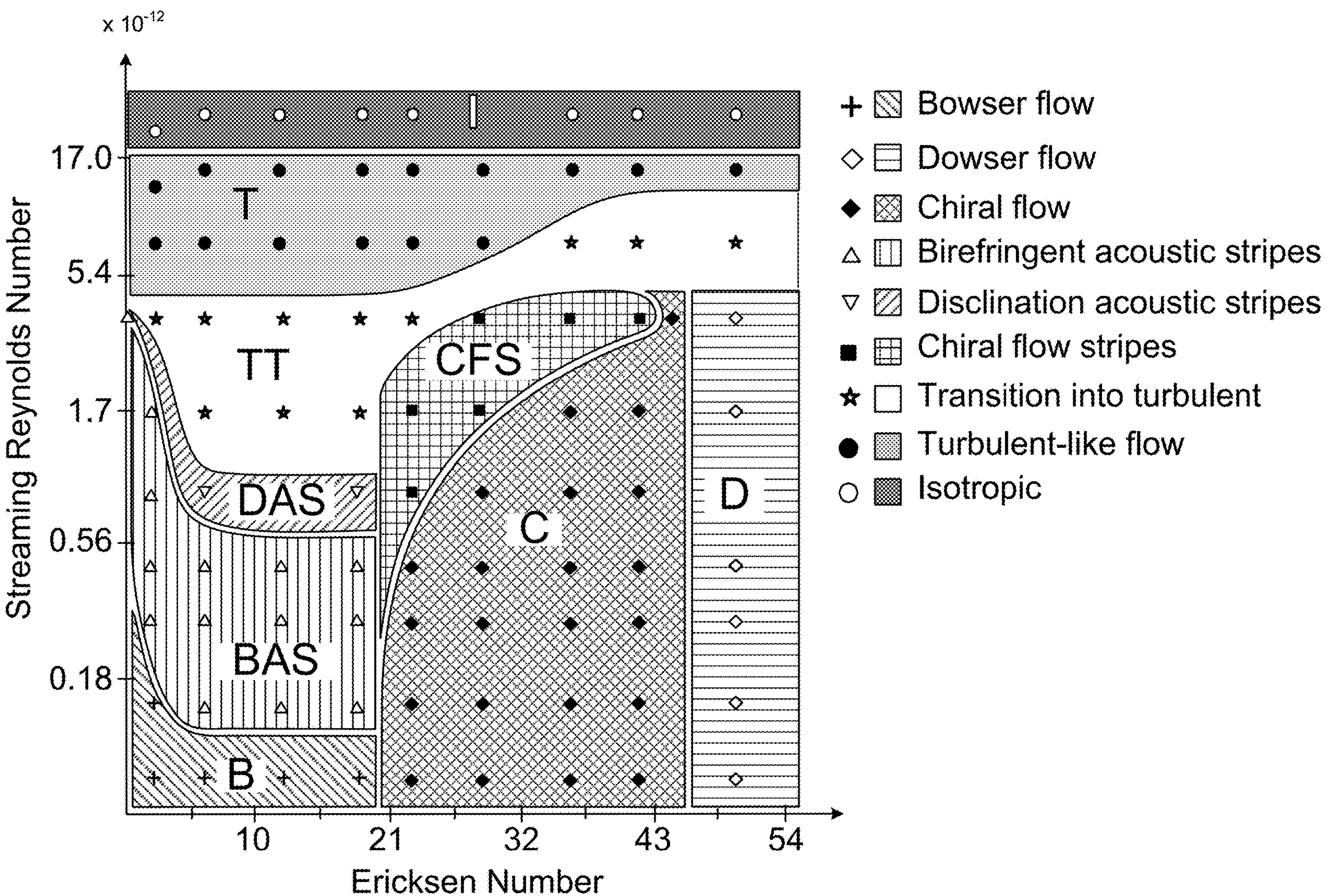
FIG. 3B shows a phase diagram summarizing the acoustofluidic patterns observed from applying SSAWs and Poiseuille flow of the nematic liquid crystal.

FIG. 3B shows a phase diagram summarizing the observed acoustofluidic-induced patterns. The phase diagram shows three main areas of interest where the first area (B, C, and D) corresponds to the section where the molecular orientation of the NLC is dominated by pressure-driven flow which corresponds to bowser, chiral, and dowser states, respectively. The second area (T and TT) exhibits a molecular orientation dominated by the turbulent-like flow and acoustic streaming imposed by high acoustic wave amplitude. The third area (BAS, DAS, and CFS) corresponds to the acoustic stripe regime where the molecular orientation follows a superposed behavior between stripe patterns induced by acoustics and fluidic response due to pressure-driven flow-mediated molecular alignment.

As seen from the results shown in FIGS. 3A and 3B, the interplay between relatively low acoustic intensity and weak pressure-driven flow regime results in a birefringent optical effect without elevating the temperature of the system significantly.

Figures 4A, 4B, 4C, 4D, 4E, 4F:
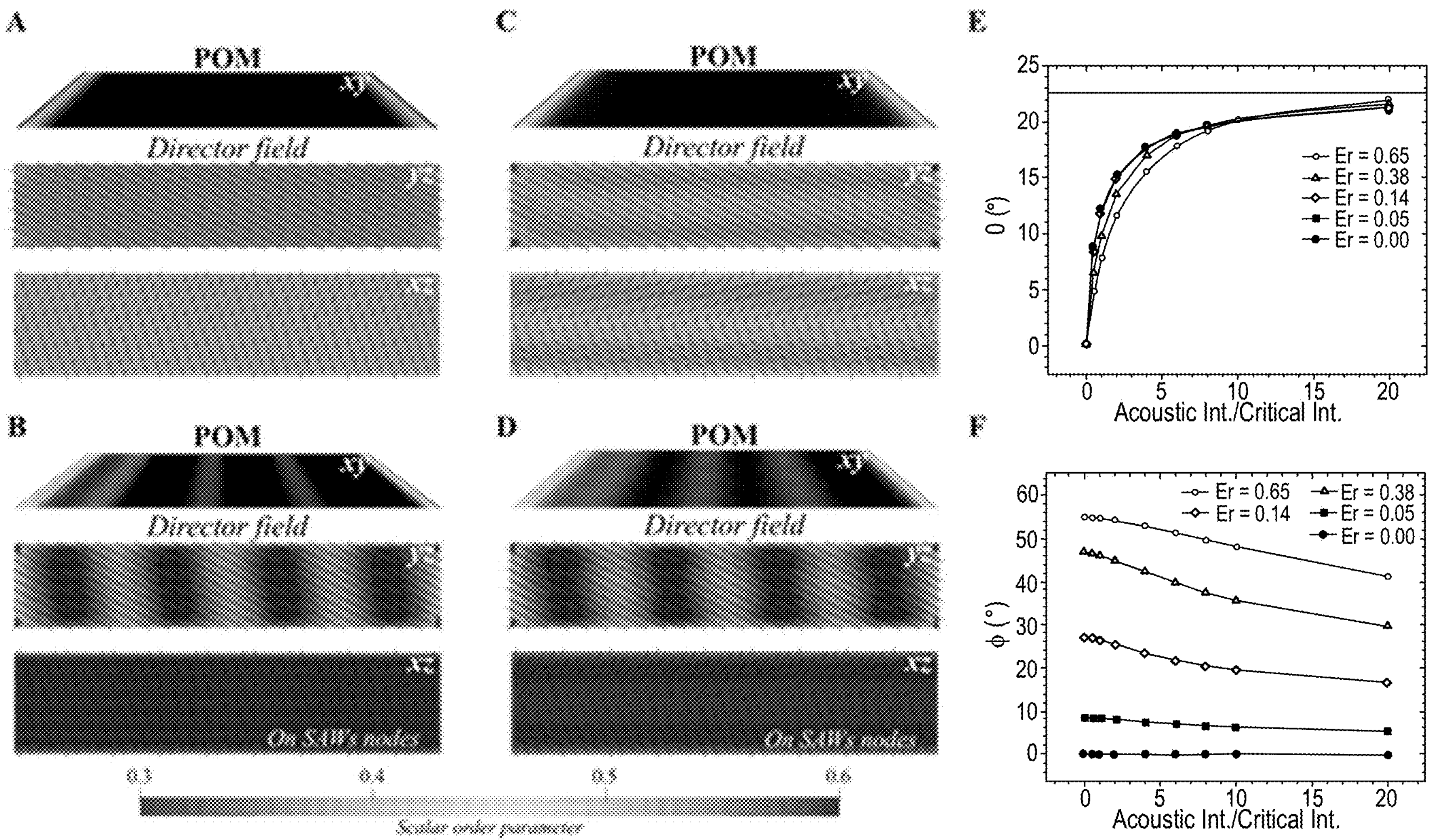
FIGS. 4A-4F show results of a numerical simulation of POM and director orientation in a weak pressure-driven flow regime under actuation of an acoustic wave.

FIGS. 4A-4F show results of a numerical simulation of POM and director orientation in a weak pressure-driven flow regime under actuation of an acoustic wave. FIG. 4A shows a POM for very weak flow regime with $Er=0.05$ without SAWs slightly bowed the director field toward the flow direction (x-axis). FIG. 4B shows a POM resulting from applying an acoustic wave across the channel in a very weak flow regime. This promotes tilting the director across the channel and decreasing its bowed shape along the flow direction in the vicinity of acoustic pressure nodes. FIG. 4C shows increments in the weak flow regime to $Er=0.65$ bowed the director more toward the flow direction. FIG. 4D shows applying an acoustic wave across the channel in a weak flow regime promotes tilting of the director across the channel and decreases its bowed shape along the flow direction in the vicinity of acoustic pressure nodes.

FIG. 4E shows the angle $\theta$ of tilted nematic molecules across the channel on acoustic pressure nodes at $z/h=1/6$. Molecules tilt more at a higher acoustic intensity and less at the same acoustic intensity with a higher nematic flow. The solid line indicates the Rayleigh angle of incidence. FIG. 4F shows the angle $\varphi$ of tilted nematic molecules along the channel measured on acoustic pressure nodes. Stronger flow bowed the molecules more along the channel whereas higher acoustic intensity decreases the bowed shape. Numerical analysis was done in the weak flow regime with Er between 0 and 0.65. It should be noted that the scale in simulations is orders of magnitude smaller than that in experiments.

Optical Manipulation of the Acoustic Optofluidic Device

The optical intensity profile across the channel in an acoustofluidic-induced color stripe region can be modulated by precise tuning of the amplitude of the applied acoustic waves and the pressure-driven nematic flow allowing changes in the location and intensity of the peak of optical intensity.

Figures 5A, 5B, 5C, 5D:
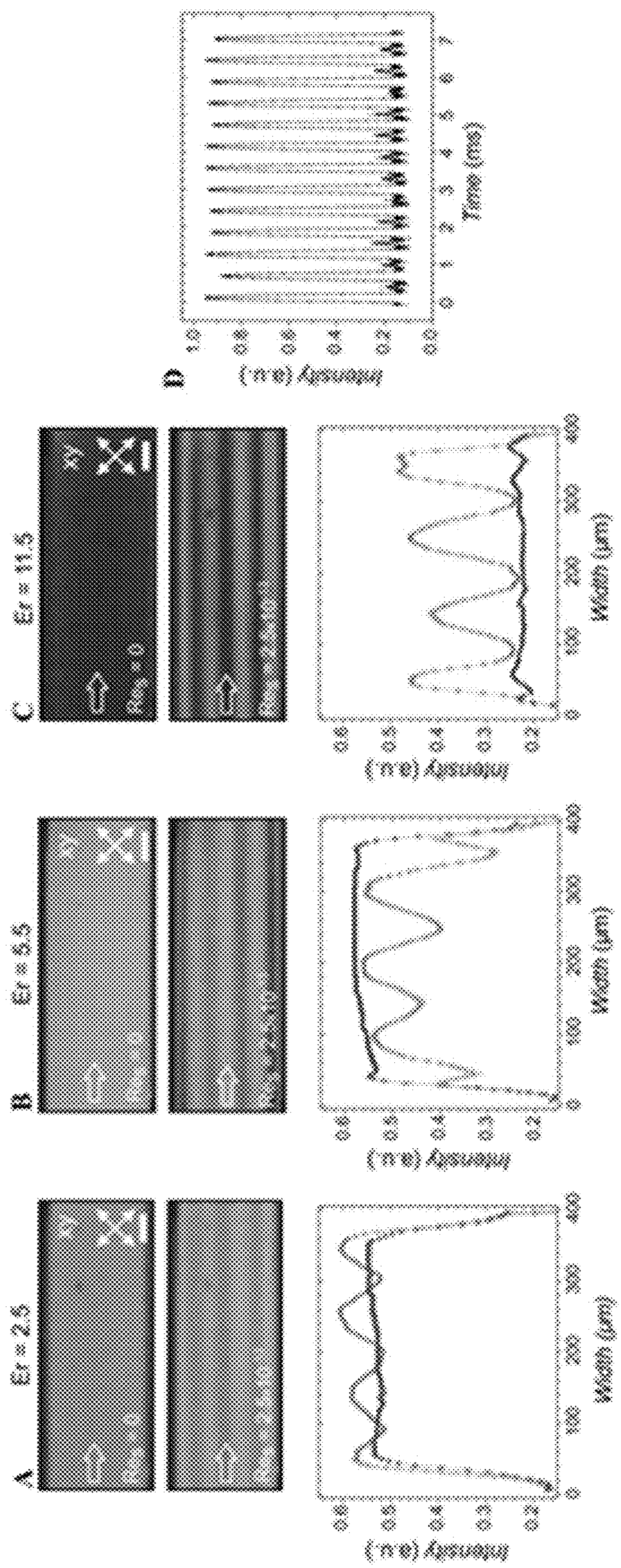
FIGS. 5A-5C show changes in optical intensity with and without SSAWs for a constant flow rate.
FIG. 5D shows optical response time.

FIGS. 5A-5C show changes in optical intensity with and without SSAWs for a constant flow rate. As shown in FIG. 5A, applying a nematic flow with $Er=2.5$ generates a uniform increase in optical intensity within the channel. At this flow, simultaneous application of an acoustic wave with $Re_s=2.5\times10^{-13}$ induces optical intensity peaks on the pressure nodes. Interestingly, increasing the flow to $Er=5.5$ with the same input power shifts the spatial location of the peaks of optical intensity to the location of the pressure anti-nodes along with a reduction on the maximum value of optical intensity compared with the base value obtained with flow only (FIG. 5B). An increase in flow to $Er=11.5$ with the same SAWs input power, shifts the optical intensity pattern back, with peaks of intensity at the pressure nodes (FIG. 5C). In this case, the optical intensity is significantly higher than the one observed only with the flow. These results show the ability to generate and control patterns of increased optical intensity by applying acoustic waves as well as tuning the input power and the flow rate in the channel.

FIG. 5D shows optical responses to changes in flow rates. As can be seen, the LC optical response times to flow rate changes are sub-millisecond. This indicates that the NLC can respond much faster to optical changes induced by changes in flow than changes induced by switching acoustic waves on and off.

Applications

The acoustic optofluidic devices described herein exhibit a combination of fast response times provided by fluid flow (as shown in FIG. 5D) with precise control over the location and intensity of the optical response from the NLC. This can be modulated by the location of the pressure nodes of the imposed acoustic wave which can be used to obtain fast ON/OFF states in the whole channel as well as in localized areas within the channel (as shown in FIGS. 5A, 5B, and 5C).

EXPERIMENTAL

Experiments were performed within microfluidic channels with rectangular cross section, with depth h=40 μm, width w=400 μm, and length L=12 mm. The NLC 5CB (Sigma-Aldrich) which exhibits the nematic phase between 18 and 35° C. was used. The channels were fabricated out of polydimethylsiloxane (1:10 curing agent to PDMS base; SYLGARD 184, Dow Corning) and bonded to the piezoelectric substrate after components were exposed to air plasma (Harrick Plasma, Plasma Cleaner Model PDC-001). The channel walls were chemically treated with a 0.4 wt % aqueous solution of N-dimethyl-n-octadecyl-3-aminopropyl-trimethoxysilyl chloride (DMOAP, Sigma-Aldrich) to induce strong homeotropic surface anchoring for 5CB molecules.

Interdigitated transducers (IDTs) were patterned into a 128° Y-cut of LiNbO3 piezoelectric substrate (Roditi) by using standard lithography techniques and vapor deposition of 10 nm Platinum adhesion layer followed by 80 nm gold layer. The single electrode transducer pitch was set to 50 μm to achieve a wavelength of 200 μm. The high voltage of RF signal was generated using a GHz generator (Hewlett Packard, Model E4431B) subsequently amplified using a power amplifier (Minicircuits, Model ZHL-1-2W-N+). Before experimenting, channels were filled up with the 5CB in the isotropic phase and then slowly cooled down to room temperature. The temperature was controlled using a Linkam PE120 temperature controller controlling the hot stage under the microscope.

What is claimed is:

1. An optofluidic device comprising:
- a channel with liquid crystal material therein;
- one or more transducers configured to output acoustic waves, wherein the one or more transducers and the channel are disposed such that the output acoustic waves interact with the liquid crystal material; and
- a vacuum or pressure source configured to induce fluid flow of the liquid crystal material in the channel.

2. The optofluidic device of claim 1, wherein the channel is disposed between first and second transducers.

3. The optofluidic device of claim 1, wherein the device includes only one transducer.

4. The optofluidic device of claim 1, wherein the channel is in contact with the one or more transducers.

5. The optofluidic device of claim 1, wherein at least part of the channel is coated with a material capable of inducing surface anchoring of the liquid crystal material.

6. The optofluidic device of claim 5, wherein the material is capable of inducing homeotropic anchoring in at least a portion of the liquid crystal material.

7. The optofluidic device of claim 5, wherein the material is capable of inducing planar anchoring in at least a portion of the liquid crystal material.

8. The optofluidic device of claim 1, wherein a first region of the channel is coated with a first material capable of anchoring the liquid crystal material in a first orientation and a second region of the channel is capable of anchoring the liquid crystal material in a second orientation, wherein the second orientation is different from the first orientation.

9. The optofluidic device of claim 1, wherein the liquid crystal material comprises homeotropic anchored nematic liquid crystals.

10. The optofluidic device of claim 1, wherein the liquid crystal material comprises planar anchored nematic liquid crystals.

11. The optofluidic device of claim 1, wherein the liquid crystal material comprises both planar and homeotropic anchored liquid crystals.

12. The optofluidic device of claim 1, wherein the one or more transducers are formed in a piezoelectric substrate.

13. The optofluidic device of claim 12, wherein at least a portion of the channel is bonded to or formed in or on the piezoelectric substrate.

14. The optofluidic device of claim 1, wherein the acoustic waves are surface acoustic waves.

15. The optofluidic device of claim 1, wherein the acoustic waves are bulk acoustic waves.

16. The optofluidic device of claim 1, wherein an optical response is generated.

17. A method comprising:
- providing an optofluidic device according to claim 1,
- applying a signal to the one or more transducers for transformation into acoustic waves to interact with the liquid crystal material and/or apply a signal to induce fluid flow of the liquid crystal material, to thereby induce reorientation of liquid crystal molecules in the liquid crystal material.

18. The method of claim 17, further comprising causing pressure-driven flow of the liquid crystal material in the channel.

19. The method of claim 17, wherein an optical response is generated by the reorientation of liquid crystal molecules.

20. The method of claim 19, wherein the optical response is characterized by patterns induced by the acoustic waves and the fluid flow.

21. The method of claim 19, wherein the optical response is characterized by a stripe pattern.

22. The method of claim 19, wherein the optical response is characterized by birefringent lines at pressure nodes in the channel.

23. The method of claim 19, wherein the optical response is a sub-millisecond optical response.

24. The method of claim 19, wherein the optical response can be modulated by controlling the amplitude, frequency, and other properties of the acoustic waves.

25. The method of claim 18, wherein an optical response can be modulated by controlling the flow rate and other properties related to the fluid flow generated in the channel.

* * * * *